United States Patent [19]

Krueger et al.

[11] 4,231,204
[45] Nov. 4, 1980

[54] SOLAR ENERGY COLLECTOR

[75] Inventors: Wallace F. Krueger, Toledo; Anthony R. Shaw, Waterville, both of Ohio

[73] Assignee: Libbey-Owens-Ford Company, Toledo, Ohio

[21] Appl. No.: 892,110

[22] Filed: Mar. 31, 1978

[51] Int. Cl.³ ............................. E04B 1/62; F24J 3/02
[52] U.S. Cl. ...................................... 52/397; 126/450; 52/400; 52/824
[58] Field of Search .................. 126/270, 271; 52/476, 52/769, 656, 802, 805, 824, 400, 397; 292/342, 343

[56] References Cited

U.S. PATENT DOCUMENTS

| 943,801 | 12/1909 | Watson | 52/476 |
|---|---|---|---|
| 1,848,715 | 3/1932 | Hart | 52/805 |
| 1,984,130 | 12/1934 | Halvorsen | 292/342 X |
| 2,250,624 | 7/1949 | Bugatti | 52/400 |
| 3,455,080 | 7/1969 | Meadows | 52/476 |
| 4,007,728 | 2/1977 | Guba | 126/271 |
| 4,044,424 | 8/1977 | Sasgen | 292/343 X |

OTHER PUBLICATIONS

"New LOF Product Harnesses Solar Energy", *The Shield*, Publ. by Libbey–Owens–Ford, Dec., 1976, p. 6.

*Primary Examiner*—Carroll B. Dority, Jr.
*Assistant Examiner*—Lee E. Barrett
*Attorney, Agent, or Firm*—Collins, Oberlin & Darr

[57] ABSTRACT

A solar energy collector including an enclosure provided with a glazing closure or panel and a detachable retainer assembly securing the glazing panel in place. The retainer assembly includes a retainer cap mechanically interlocked with internal protrusions formed on the enclosure walls and a spring clip associated with the retainer cap for urging the same in such interlocked relation with the enclosure wall protrusions.

9 Claims, 5 Drawing Figures

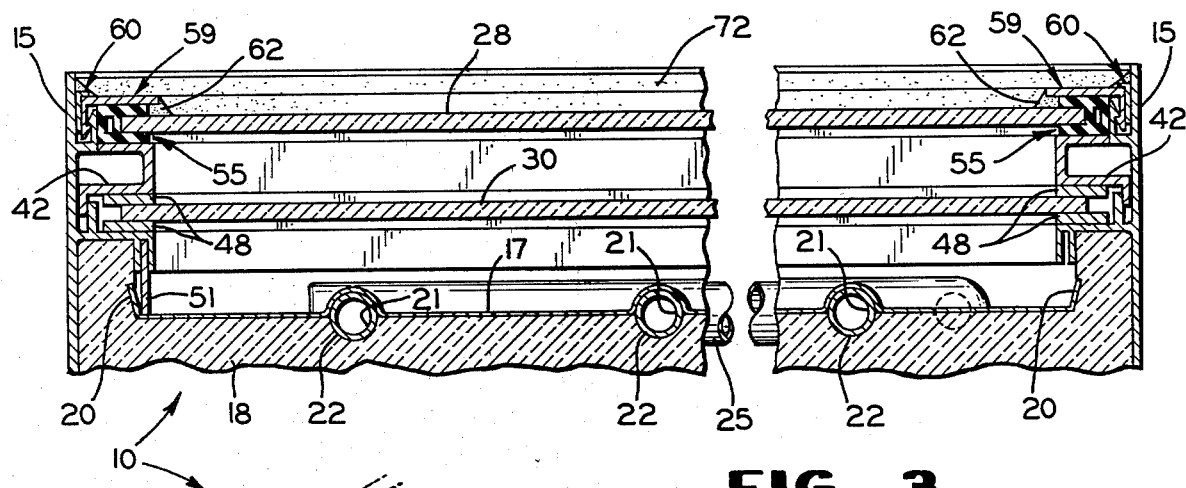
FIG. 3
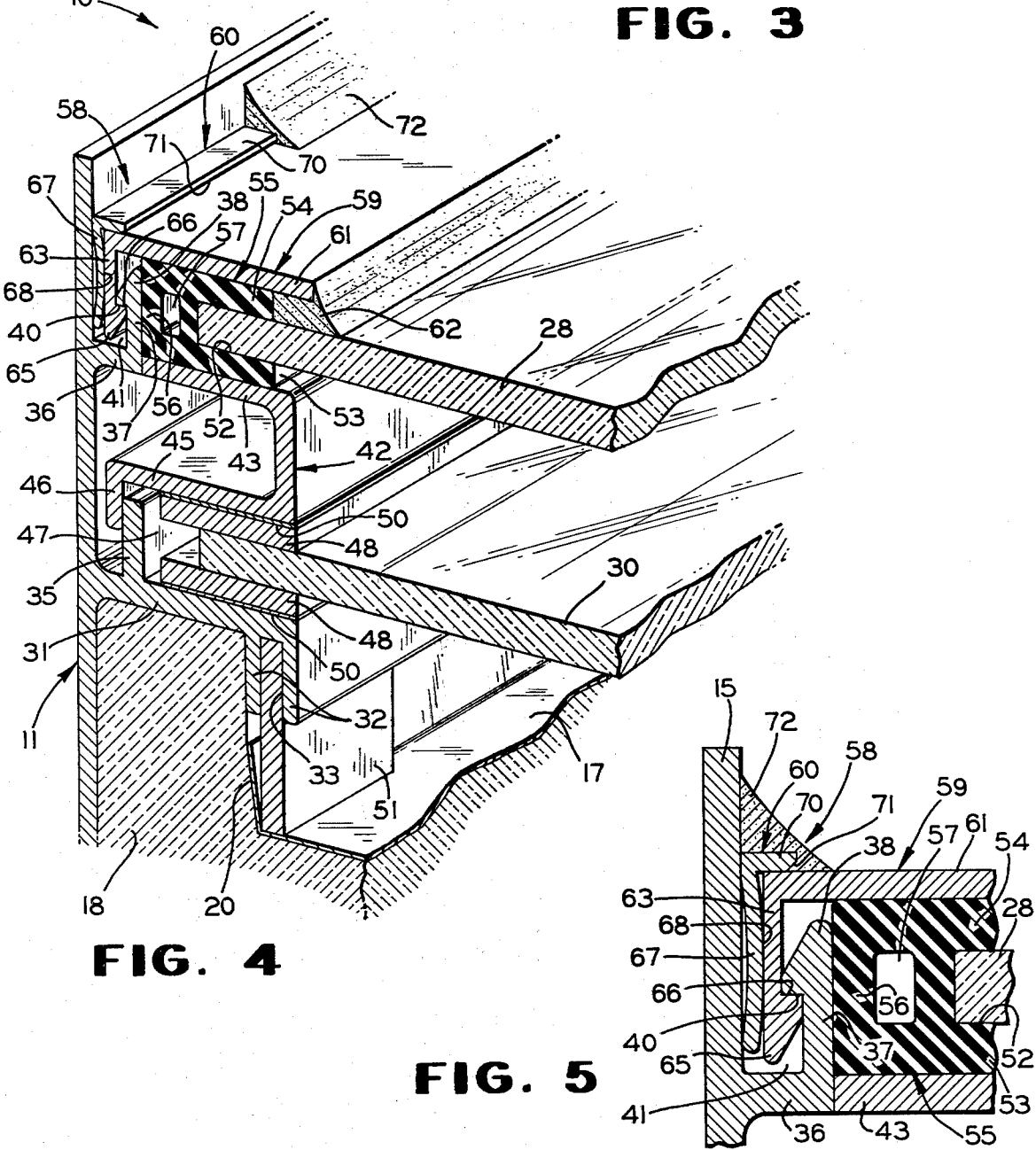
FIG. 4
FIG. 5

SOLAR ENERGY COLLECTOR

BACKGROUND OF THE INVENTION

This invention relates generally to solar energy collectors and, more particularly to a new and useful flat solar energy collector having a novel construction.

Solar energy collectors have become increasingly popular in recent years in an effort to harness the substantially unlimited and free source of energy provided by the sun, especially in view of the shortages and ever-increasing costs of conventional energy sources, such as fossil fuels, for example. Conventional solar collectors usually include a rigid enclosure for housing a metallic heat absorbing plate provided with fluid conveying conduits and supported on heat insulating material. The open end of the enclosure is covered by at least one glazing panel, which may be optically transparent glass or plastic, and which is rigidly secured in place by angled brackets or other retaining elements.

One problem encountered with such known collectors is the difficulty in removing these retaining elements when necessary to gain access into the collector unit for repair, removal and/or replacement of damaged glazing panels as well as other components located therewithin. Moreover, the retaining elements frequently are broken or otherwise damaged during removal, requiring their replacement when reassembling the collector unit.

SUMMARY OF THE INVENTION

An object of the present invention is to overcome the above-noted shortcomings by providing a flat solar energy collector having a novel retainer means which can be quickly and easily installed and removed.

Another object of this invention is to provide the foregoing solar energy collector with retainer means providing a mechanical interlock with the associated enclosure to maintain structural integrity when assembled and which can be readily removed for providing access into the unit.

A more specific object of the present invention is to provide a releasable spring clip for use in conjunction with a retainer element for maintaining the latter secured in an assembled relation and which is readily removable to permit detachment of the retainer element.

In one aspect thereof, the solar energy collector of the present invention is characterized by the provision of a removable retainer assembly comprising an angled retainer cap mechanically interlocked with internal protrusions formed on the enclosure walls of the collector and a removable spring clip inserted behind a portion of the retainer cap and interposed between the latter and the enclosure wall with a friction fit for urging the retainer cap in such interlocked relation with the enclosure wall protrusions.

The foregoing and other objects, advantages and characterizing features of this invention will become clearly apparent from the ensuing detailed description of an illustrative embodiment thereof, taken together with the accompanying drawings wherein like reference numerals denote like parts throughout the various views.

BRIEF DESCRIPTION OF THE DRAWINGS

FIG. 3 is a cut-away transverse sectional view, on an enlarged scale, taken along the line 3—3 of FIG. 2;

FIG. 4 is a perspective sectional view, on an enlarged scale, showing details of the solar energy collector construction of this invention; and FIG. 5 is an enlarged, fragmentary transverse sectional view showing details of the solar collector retainer means.

DESCRIPTION OF THE PREFERRED EMBODIMENT

Figure 1:
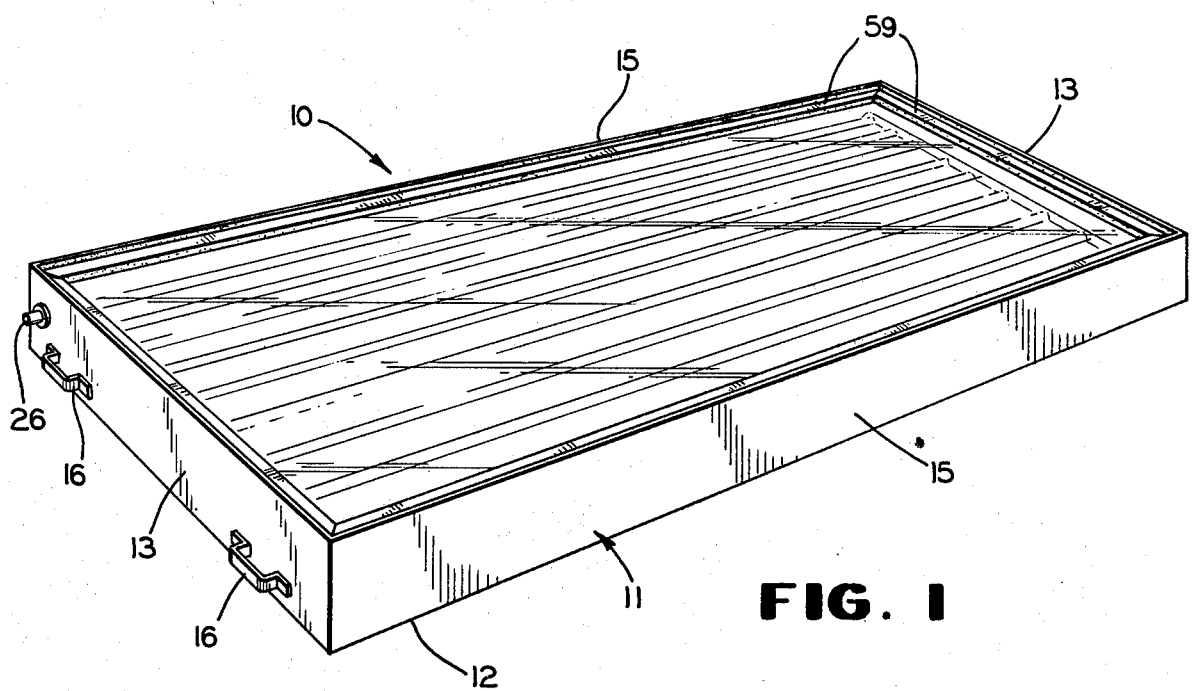
FIG. 1 is a perspective view of a solar energy collector embodying the novel features of this invention.
Figure 2:
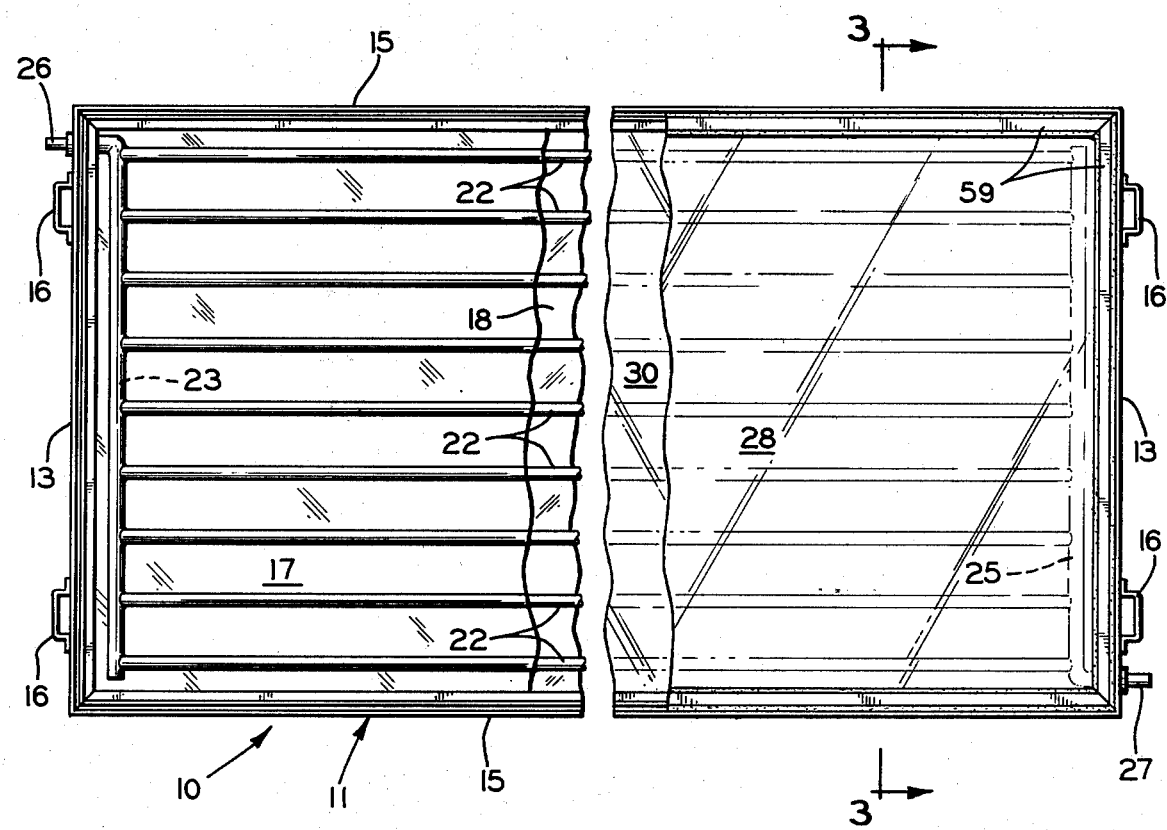
FIG. 2 is a cut-away top plan view of the solar energy collector of FIG. 1.

Referring now in detail to the illustrative embodiment depicted in the accompanying drawings, there is shown in FIG. 1 a solar energy collector, comprehensively designated 10, constructed in accordance with this invention and embodying certain new features of this invention. The collector 10 comprises a generally rectangularly shaped, box-like enclosure 11 having a base portion or bottom wall 12, a pair of end walls 13, a pair of side walls 15, and an open top covered by glazing as will hereinafter be more fully described. The bottom, end and side walls can be formed of sheets or strips of a suitable extruded metal, such as aluminum for example, all welded or otherwise suitably secured at their joints to form a rigid, unitary construction possessing sufficient strength to form a component part of a roof, if desired.

A pair of laterally spaced handles 16 are affixed to each end wall 13, or alternately can be attached to the side walls, if desired, to facilitate handling thereof. Also, while the outer surfaces of walls 13, 15, 16 and 17 are substantially planar, their inner surfaces are formed with various inwardly extending protrusions or formations hereinafter more fully described.

As best shown in FIG. 3, the enclosure 11 houses a heat collecting or absorbing plate 17 spaced from the bottom wall 12 and supported on a relatively thick layer of heat insulating material 18, such as fiberglass for example, which completely fills the space between the bottom wall 12 and heat absorbing plate 17. The plate 17 is formed with upturned flanges 20 along the sides thereof and a series of longitudinally extending grooves or channels 21 spaced transversely of the plate 17 for receiving a plurality of laterally spaced tubes or conduits 22 soldered or otherwise rigidly secured within the channels 21 or plate 17 to provide a good mechanical contact ad thereby optimum heat exchange therebetween. While the heat absorbing plate 17 and conduits 22 can be formed of any suitable heat conducting material, preferably they are formed of copper which offers the highest resistance to corrosion while providing maximum heat transferability. The upper or solar energy exposed surface of the heat absorbing plate 17 can be coated with a radiant energy absorbent material, preferably black in color, to further increase solar energy absorption thereby.

The conduits 22 extend longitudinally of the enclosure 11 and are connected at their one ends to a common header or manifold 23 for delivering ambient fluid to the conduits 22 and at thier other ends to a common header or manifold 25 for removing the heated fluid from conduits 22. Manifold 23 is provided with an inlet 26 projecting through one end wall 13 for connection to a piping system delivering ambient fluid thereto and manifold 25 is provided with an outlet 27 projecting through the other end wall 13 for connection to a piping system conveying the heated fluid to a storage area or any desired location for heating purposes.

The solar energy collector of the illustrative embodiment includes two transparent glazing panels 28 and 30 preferably formed of tempered glass which possesses the requisite strength to withstand the elevated temperatures generated within the collector and the abuse they are subjected to during handling and in use. These glazing panels 28 and 30 allow the sun's solar rays to pass therethrough but prevent escape of the infrared rays emitted by the heat absorbing plate 17. Glazing panels 28 and 30 are mounted in vertically spaced relation to provide a dead airspace therebetween offering optimum thermal insulation and better heat retention within the collector. While preferably two glazing panels are employed in the solar energy collector of the illustrative embodiment, it should be understood that only one glazing panel can be utilized where conditions and economics warrant within the provision of this invention.

As best shown in FIG. 4, the means for mounting the glazing panels 28 and 30 in their vertically spaced relation comprise the heretofore mentioned internal protrusions which include a protuberance 31 extending inwardly from and substantially normal to side wall 15 and having a pair of spaced fingers 32 adjacent the inner end thereof extending downwardly and defining a channel 33 therebetween. An integral upright extension 35 projects upwardly from protuberance 31 in spaced relation and substantially parallel to side wall 15. Another perpendicularly extending proturbance 36 is located adjacent the upper end of side wall 15 and is provided with a right angularly related, upright extension 37 terminating in an enlarged head formation 38 defining a shoulder 40. The upright extension 37 is spaced from and generally parallel to side wall 15 defining a channel 41 therebetween for a purpose that will hereinafter become apparent.

A generally U-shaped member 42 having its open end facing side wall 15 is supported on the inboard glazing panel 30 with one leg 43 thereof abutting the base of upright extension 37. The other leg 45 is formed with a depending skirt 46 overlying and affixed to the upper end of extension 35. The upper leg 43 of member 42 serves as a support for the outboard glazing panel 28 while the lower leg 45, together with protuberance 31, defines a channel opening 47 in which the marginal edge of the inboard glazing panel 30 is located.

For convenience of description, the construction of solar energy collector 10 adjacent one side wall 15 only is shown (FIG. 4) and described in detail. It should be understood that identical structure extends about the entire inner periphery of the collector and that the opposite side wall 15, as well as end walls 13, are provided with the several interior protrusions and construction shown in FIGS. 4 and 5.

The marginal edge of inboard glazing panel 30 is located in channel 47 and is sandwiched between a pair of woven fiberglass tapes 48, each having a coating of pressure sensitive adhesive 50 applied to the outer surface thereof for adhesively securing the tapes 48 to the leg 45 of member 42 and the upper surfaces of protuberance 31, respectively. Thus, inboard glazing panel 30 is somewhat resiliently mounted within channel 47 by means of the fiberglass tapes 48. A resiliently yieldable material (not shown) can be deposited at spaced intervals about the periphery of the glazing panel 30 between the edge of the latter and extension 35 to maintain panel 30 substantially centered within the enclosure 11 and to preclude excessive rectilinear movements of the panel 30 when the collector 10 is placed on edge during handling and/or storage.

A series of insulating spacers 51 are interposed between the heat absorbing plate 17 and inboard glazing panel 30 to maintain a predetermined spacing therebetween. The upper ends of the spacers 51 are received in channel 33 of protuberance 31 and engage the plate 17 at their respective lower ends. The spacers 51 are located at longitudinally spaced intervals along the sides of heat absorbing plate 17 adjacent the flanges 20 thereof to prevent upper displacement of the plates 17 relative to inboard glazing panel 30. This maintains the upper edge of flanges 20 spaced from fingers 32 and other metallic components to preclude heat transmission and losses therethrough from the heated absorbing plate 17 to the enclosure walls.

The marginal edge of outboard glazing panel 28 is mounted in a groove 52 formed by a pair of spaced legs 53 and 54 of a gasket 55 of U-shaped configuration in cross section and preferably formed of heat resistant rubber. However, any other suitable resiliently yieldable, elastomeric material may be used in lieu of rubber, if desired. The lower leg 53 of U-shaped gasket 55 is supported on the upper leg 43 of member 42 which serves as a support for the gasket 55 and outboard glazing panel 28. The edge of glazing panel 28 is placed against the end wall of the groove 52 to maintain the panel substantially centered within enclosure 11. However, the web 56 of gasket 55 is provided with an opening 57 therein to provide limited resiliency in accommodating slight rectilinear movements of the panel 28, such as might occur when the collector 10 is placed on edge during handling and/or storage for example.

It is sometimes desirable to gain access into the enclosure 11 for repairing and/or replacing the glazing panels or other damaged components. This has been difficult to achieve with prior art solar collectors because of their rigid constructions, necessitating damage to the frame construction or other retaining elements in order to gain access into the interiors thereof.

The above noted disadvantage has been substantially eliminated by the provision of a novel removable retainer assembly, generally designated 58, constructed in accordance with this invention for securing the glazing panels and other components of the solar energy collector in place and for facilitating entry into the enclosure 11 when desired without damaging any of the component parts thereof. To this end, the retainer assembly 58 comprises a first element in the form of a retainer cap 59 mechanically interlocked with the enclosure and a second element in the form of a resiliently yieldable spring or lock clip 60 maintaining the former in such interlocked relation with the enclosure. The retainer cap 59 consists of a sheet metal fabrication of unitary, one-piece construction formed to provide a horizontally extending, inwardly projecting flange 61 overlying the marginal edge of outboard panel glazing 28 and resting on the upper leg 54 of gasket 55. As shown in FIG. 4, the flange 61 extends inwardly past the gasket 55 in spaced relation to the outboard glazing panel 28. The void between glazing panel 28 and flange 61 adjacent the end thereof is filled with a mastic sealant material 62 to provide a fluid tight pressure seal therebetween to prevent the ingress of ambient air and moisture into the enclosure 11 and the egress of heated air from within the enclosure. While preferably the sealant is formed of silicone, it should be appreciated that any suitable, fluid impermeable sealant can be used, as desired.

The retainer cap 59 also is formed with a vertical leg 63 extending downwardly from flange 61 for insertion into the channel 41 formed between side wall 15 and upright extension 37. A tapered head 65 is formed on the distal end of leg 63 and defines a shoulder 66 adapted to engage behind the shoulder 40 on extension 37. This arrangement provides a mechanical interlock detachable securing the retainer cap 59 to the enclosure 11.

The clip 60 consists of a sheet metal fabrication of unitary, one-piece construction formed to provide an elongated body having a downwardly extending tongue portion 67 adapted to be wedged into channel 41 with a friction fit into the remaining space left between the outer flat face of retainer cap leg 63 and the inner surface of side wall 15. Body portion 67 is arched or curved in transverse cross section, to provide a central, arcuately curved, bearing surface 68 (FIG. 5) for biased engagement against the outer face of leg 63 and forms a tight connection therewith. The opposite ends of tongue portion 67 retreat away from the arcuately curved central portion and engage side wall 15 in the assembled relation shown in FIG. 5. This bowed configuration of tongue portion 67 serves as a bias, urging the retainer cap leg 63 inwardly to prevent displacement of tapered head 65 from behind shoulder 40. One end of tongue portion 67 is provided with a horizontally extending lip 70 overlying the flange 61 of retainer cap 59 adjacent the intersection of flange 61 with leg 63. Any gravitation of retainer cap leg 63 towards side wall 15 would urge tongue portion 67 outwardly with consequent downward movement of lip 70 to press flange 61 against the gasket 55 and enhance securement of glazing panel 28 thereby. The free end lip 70 is beveled, as shown at 71, to facilitate insertion of a screw driver or another appropriate work tool therebeneath to pry the wedged clip 60 upwardly for removing the same, when desired. A suitable mastic sealant material 72 completely encapsulates lip 70 and a portion of the retainer cap flange 61 to provide a fluid tight pressure seal therebetween.

When necessary to gain access into enclosure 11, the sealant 72 is ruptured to permit the insertion of a suitable tool beneath the beveled edge 71 to lip 70 to pry the wedged clip 60 upwardly from behind the retainer cap leg 63. Then, the sealant 62 can be ruptured and the retainer cap 59 shifted bodily rearwardly toward side wall 15 for disengaging the enlarged head 65 of leg 63 from behind shoulder 40 of upright extension 37 to free the leg 63 for removal thereof upwardly from within channel 41. Thus, the entire retainer cap 59 can be bodily removed to provide access into the solar energy collector 10 for repairing or replacing damaged glazing panels or other components while leaving the retainer cap intact without damage thereto for subsequent installation during reassembly of the solar energy collector.

From the foregoing, it is apparent that the present invention fully accomplishes its intended objects by providing a new and useful solar energy collector. As a result of this invention, the solar collector is provided with a novel detachable retainer assembly comprised of a retainer cap and a spring clip associated therewith for assuring interlocking engagement of the cap with the enclosure to maintain structural integrity when assembled therewith and which facilitates retainer cap removal for providing access into the collector. While the retainer arrangement of this invention has been described in combination with a solar energy collector, it should be appreciated that its utility is not in any way restricted to such use, but can be employed in various applications where desired to secure a closure member in place on a container, an enclosure, or the like.

It is to be understood that the form of the invention herein shown and described is to be taken as an illustrative embodiment only of the same, and that various changes in the shape, size and arrangement of parts may be restored to without departing from the spirit of the invention.

We claim:

1. A solar energy collector comprising an enclosure including an outer peripheral wall having spaced first and second protrusions formed integral therewith, said protrusions having extensions generally parallel to said wall in spaced relation thereto, said first protrusion extension defining the end wall of a channel and terminating in an enlarged formation, a support member affixed to said second protrusion extension and having a supporting surface defining one side wall of said channel, at least one glazing panel within said enclosure, and detachable retainer means for securing said glazing panel in place and comprising a first element mechanically interlocked with said enlarged formation and having a portion defining the other side wall of said channel and overlying the marginal edge of said glazing panel, a sealing member disposed in said channel about the marginal edge of said glazing panel, said retainer means including a second element urging said first element in interlocked relation with said enlarged formation of said first protrusion.

2. A solar energy collector according to claim 1, wherein said first element comprises a unitary one-piece construction of sheet material having a flange constituting said side wall defining portion and a right angularly related leg portion having an enlarged head at the distal end thereof for interlocking engagement with said enlarged formation.

3. A solar energy collector according to claim 2, including a fluid tight sealant adjacent the free end of said flange disposed in the space between said flange and said glazing panel.

4. A solar energy collector according to claim 2, wherein said second element comprises a unitary one-piece construction of sheet material having a tongue portion disposed between said leg portion and said enclosure wall with a friction fit therebetween for urging said leg portion head in such interlocked engagement with said enlarged formation.

5. A solar energy collector according to claim 4, wherein said tongue portion is arcuately curved in transverse cross section to provide a central curved surface in bearing engagement against said leg portion and end portions retreating away from said curved surface and bearing against said enclosure wall.

6. A solar energy collector according to claim 4, wherein said second element is formed with a lip projecting laterally from one end of said tongue portion and overlying a portion of said first element flange in bearing engagement thereagainst.

7. A solar energy collector according to claim 1, wherein said first element comprises a unitary one-piece construction of sheet material having a flange overlying the marginal edge of said glazing panel in spaced relation thereto and a right angularly related leg portion having an enlarged head at the distal end thereof adapted to fit behind said enlarged formation of said first protrusion extension for interlocking engagement therewith, said second element comprising a unitary one-piece construction of sheet material having a tongue portion disposed between said leg portion and said enclosure wall with a friction fit therebetween for urging said leg portion head in such interlocked engagement with said enlarged formation.

8. A solar energy collector according to claim 7, wherein said tongue portion is arcuately curved in transverse cross section to provide a central curved surface in bearing engagement against said leg portion and end portions retreating away from said curved surface and bearing against said enclosure wall.

9. A solar energy collector according to claim 8, wherein said second element is formed with a lip projecting laterally from one end of said tongue portion and overlying a portion of said first element flange in bearing engagement thereagainst.

* * * * *